(12) United States Patent
Brundage et al.

(10) Patent No.: US 7,496,599 B2
(45) Date of Patent: Feb. 24, 2009

(54) SYSTEM AND METHOD FOR VIEWING RELATIONAL DATA USING A HIERARCHICAL SCHEMA

(75) Inventors: Michael L. Brundage, Kirkland, WA (US); Srinivasa R. Burugapalli, Sammamish, WA (US); Andrew Conrad, Sammamish, WA (US); Chris A. Suver, Seattle, WA (US); Alexander E. Vaschillo, Redmond, WA (US); Bertan Ari, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 395 days.

(21) Appl. No.: 10/136,883

(22) Filed: Apr. 30, 2002

(65) Prior Publication Data

US 2003/0204511 A1 Oct. 30, 2003

(51) Int. Cl.
*G06F 17/30* (2006.01)
(52) U.S. Cl. .................................. 707/104.1; 707/101
(58) Field of Classification Search ................ 707/100, 707/1, 101, 104.1, 103 X
See application file for complete search history.

(56) References Cited

U.S. PATENT DOCUMENTS

| | | | | |
|---|---|---|---|---|
| 5,295,261 A | * | 3/1994 | Simonetti | 707/2 |
| 5,414,834 A | * | 5/1995 | Alexander et al. | 707/100 |
| 5,467,471 A | * | 11/1995 | Bader | 707/1 |
| 5,873,091 A | * | 2/1999 | Garth et al. | 707/102 |
| 6,134,559 A | * | 10/2000 | Brumme et al. | 707/103 R |
| 6,163,781 A | * | 12/2000 | Wess, Jr. | 707/103 X |
| 6,173,439 B1 | * | 1/2001 | Carlson et al. | 717/108 |
| 6,356,897 B1 | * | 3/2002 | Gusack | 707/4 |
| 6,738,759 B1 | * | 5/2004 | Wheeler et al. | 707/3 |
| 6,754,666 B1 | * | 6/2004 | Brookler et al. | 707/102 |
| 6,985,905 B2 | * | 1/2006 | Prompt et al. | 707/102 |
| 7,143,339 B2 | * | 11/2006 | Weinberg et al. | 715/503 |
| 2002/0120630 A1 | * | 8/2002 | Christianson et al. | 707/103 R |
| 2002/0133497 A1 | * | 9/2002 | Draper et al. | 707/100 |
| 2002/0169788 A1 | * | 11/2002 | Lee et al. | 707/104.1 |
| 2003/0101194 A1 | * | 5/2003 | Rys et al. | 707/101 |
| 2003/0140034 A1 | * | 7/2003 | Probst et al. | 707/3 |

OTHER PUBLICATIONS

Rich Rollman, "Using sql:max-depth Attribute for Schemas with Recursive Elements", Jan. 2002, http:www.windowsitpro.com/SQLServer/Article/ArticleID/23358.html.*
"XQuery 1.0: An XML Query Language", W3C Working Draft, Dec. 20, 2001, http://www.w3.org/TR/2001/WD-xquery-20011220/.*
Jelliffe, R., XML.com, http://www.xml.com/pub/a/2001/01/10/schemasincontext.html, 2000, 13 pages.
Box, D., "House of Web Services: Moving to .Net and Web Services," *MSDN Magazine*, http://msdn.microsoft.com/msdnmag/issues/01/11/WebServ/print.asp, Nov. 2001, 16 pages.

* cited by examiner

*Primary Examiner*—Jean M Corrielus
(74) *Attorney, Agent, or Firm*—Woodcock Washburn LLP (57) ABSTRACT

Users and programmers view relational database tables using an schema such as an SQL-annotated XML schema. The schema describes how XML data maps into base tables and fields, including complex one-to-many and many-to-many relationships.

38 Claims, 9 Drawing Sheets

SYSTEM AND METHOD FOR VIEWING RELATIONAL DATA USING A HIERARCHICAL SCHEMA

FIELD OF THE INVENTION

The present invention relates generally to the field of computing. More particularly, the invention relates to a system and method for viewing relational data using a hierarchical schema.

BACKGROUND OF THE INVENTION

XML is rapidly becoming the vehicle of choice as a definition language for the description of content-related structures. XML provides great flexibility and universality because XML provides a grammar that can express nearly any content. On the Internet in particular, the standardized representation of content structures fosters the development of previously unrecognized applications.

More and more, mission-critical applications are designed to run on the Internet. Adding the logical structuring capability of XML to the mix, and a new infrastructure that is ideal for running electronic business applications on the Internet becomes much more feasible. Databases can now be accessed directly via XML without having to use CGI and HTML or Java in addition. XML is generally a hierarchical structured data representation.

In addition to the rise of structured content like XML, relational databases have long been the bulwark of the information infrastructure of countless businesses. Relational databases provide a primary tool for business to maintain, access, and analyze data. Such database technologies have evolved over many years so that they are optimized for accessing and manipulating large information bases. Many businesses store the majority of their critical information in relational databases. Moreover, many Internet sites managed their data using relational database technology. This approach also makes it possible to develop database search engines for sifting through the large volumes of information that "live" on the Internet. Unlike XML, relational databases are not hierarchically structured but rather are relationally structured to provide efficient management of large amounts of data.

The combination of database technology with self-describing structure of hierarchical languages such as XML opens an interesting perspective for new applications. However, the melding of the kind of tree structures supported by hierarchical languages such as XML with the form of a relational data model presents a number of issues, some of which have already been addressed and solved. One vexing issue is presented when ensuring that seemingly inapposite theoretical constructs between the two data representations must be harmonized. Hence, a mechanism that facilitates the mapping between data in the form of hierarchical data structures and relational data structures is desirable.

SUMMARY OF THE INVENTION

The invention provides a mechanism for users and programmers to produce and persist changes to semi-structured hierarchical data, such as XML data, of arbitrary size and structure generated from relational database tables using an annotated schema mechanism such as an SQL-annotated XML schema. The schema describes how XML data maps into base tables, fields, and relationships, including complex one-to-many and many-to-many relationships. In accordance with aspects of the invention, the mapping between hierarchical data and relational data is enhanced by way of notations to the schema that define particular actions to hide, sort, limit, and generate data during the mapping.

According to an aspect of the invention, a notation may be specified in the schema to exclude certain data elements in the hierarchical data. The notation allows fields in the relational data to be used as a limitation or function of the query; however, that data is not returned in the hierarchical data, e.g., the XML document.

According to an aspect of the invention, a notation may be specified in the schema to determine the number of levels of recursive referencing that should be applied while mapping the data to the hierarchical document. As a result, recursive references may be used such as a field that relates to a field of its own type (i.e. a customer of a customer), possibly indirectly through other fields.

According to an aspect of the invention, a notation may be specified in the schema to determine a sort order on a field to be returned in hierarchical data mapped from the relational data. Hence, a sorted tree structure may be generated from an otherwise unsorted data structure.

According to a further aspect of the invention, a notation may be specified in the schema to generate an identity value. The generation of the identity value provides a mechanism for inserting an identifying field in a row of a relational database when inserting data from a hierarchical data structure.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

Figure 1:
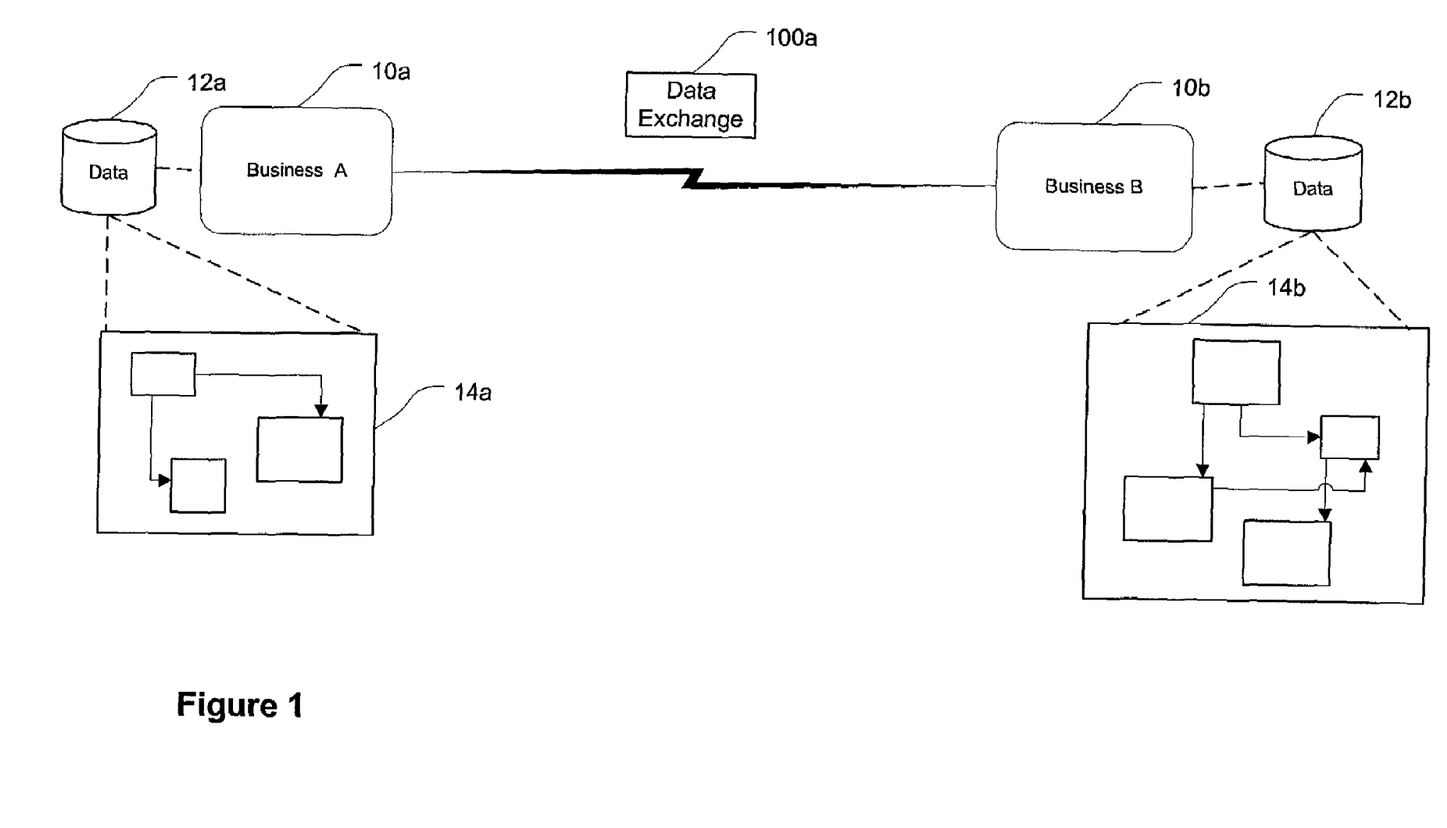
FIG. 1 is a block diagram of an example data exchange illustrating the movement of data between databases.

Electronic communications have fostered the sharing of information among institutions, businesses, individuals, etc. For example, retailers may share sales data with manufacturers, research institutions share research with other institutions and so on. FIG. 1 further illustrates the data sharing among entities. Business A 10a has data 12a comprising a relational database 14a. Business B 10b has data 12b comprising a relational database 14b. The relational databases 14a and 14b are of a proprietary design that is tailored to the individual businesses 10a and 10b. However, many businesses and other entities, such as Businesses 10a and 10b would like to exchange data 100a. The present invention contemplates that entities, such as businesses 10a and 10b, will exchange data in a self-describing hierarchical format such as XML, which has been designed for use in transferring data over a computer network. After transferring the data in an XML format from a first database, e.g., database 14a, the data can then be loaded into database 14b by converting the XML into a format appropriate for loading into a relational database.

Illustrative Computer Network Environment

Figure 2:
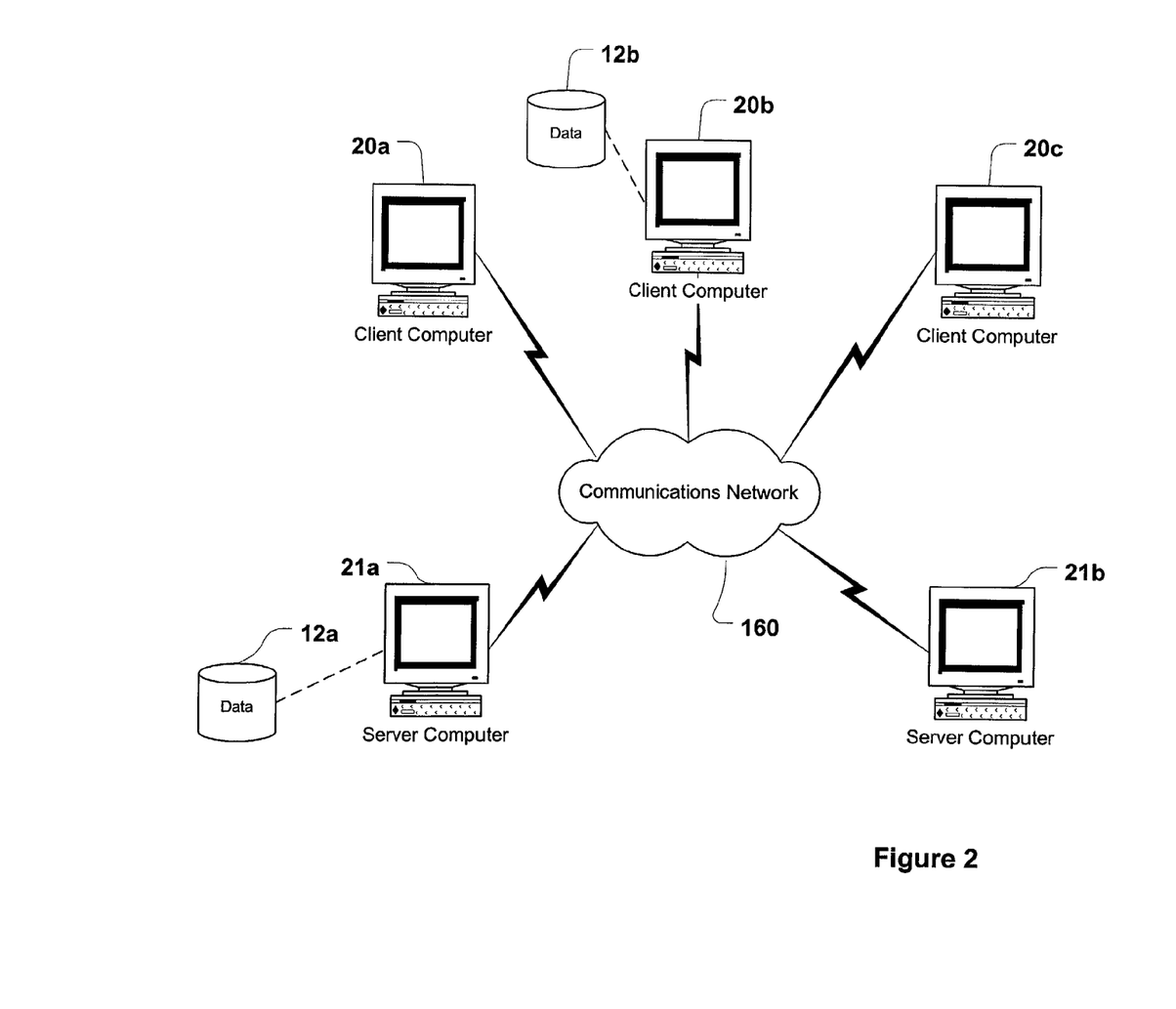
FIG. 2 is an example of a computer network wherein aspects of the present invention may be employed.

FIG. 2 illustrates how the entities, e.g., the businesses 10a, 10b, of FIG. 1 may be configured to communicate in a network environment. Here computers 20a-20c and 21a-21b may host various databases such as databases 14a and 14b of FIG. 1. Although the physical environment shows the connected devices as computers, such illustration is merely exemplary and may comprise various digital devices such as PDAs, network appliances, notebook computers, etc.

There are a variety of systems, components, and network configurations that support distributed computing environments. For example, computing systems may be connected together by wireline or wireless systems, by local networks or widely distributed networks. Currently, many of the networks are coupled to the Internet which provides the infrastructure for widely distributed computing and encompasses many different networks.

The Internet commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

The network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server). In the example of FIG. 1, computers 20a-20c can be thought of as clients and computers 21a, 21b can be thought of as servers where server 21a maintains the data that is then exported for use by the client computer 20.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

In general, the computer network may comprise both server devices and client devices deployed in a network environment (in a peer-to-peer environment devices may be both clients and servers). FIG. 2 illustrates an exemplary network environment, with server computers in communication with client computers via a network, in which the present invention may be employed. As shown in FIG. 2, a number of servers 21a, 21b, etc., are interconnected via a communications network 160 (which may be a LAN, WAN, intranet or the Internet, or a combination of any of these) with a number of client computers 20a, 20b, 20c, etc. Moreover, communication network 160 may comprise wireless, wireline, or combination wireless and wireline connections.

Thus, the present invention can be utilized in a computer network environment having client computers for accessing and interacting with the network and a server computer for interacting with client computers. However, the systems and methods of the present invention can be implemented with a variety of network-based architectures, and thus should not be limited to the example shown. The present invention will now be described in more detail with reference to an illustrative implementation.

XML Data Transfer

Figure 3:
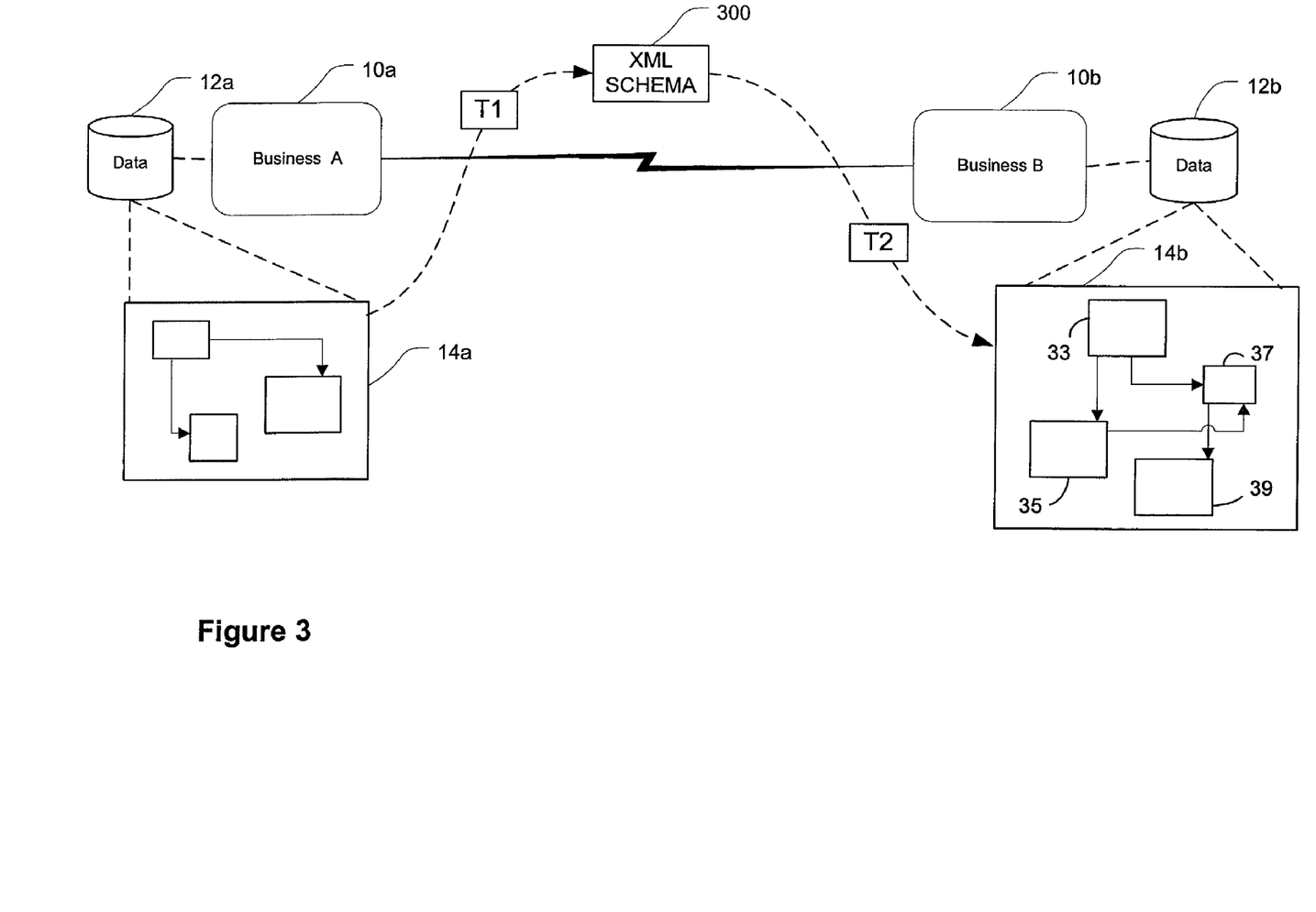
FIG. 3 is a block diagram illustrating the data exchange between database by way of a hierarchical description language.

According to an aspect of the invention, relational data is extracted or viewed, e.g., from Business A 10a, by way of a hierarchical self-describing format such as extensible markup language (XML). FIG. 3 further illustrates this aspect of the invention. Here, data is extracted from relational database 14a, which is maintained by Business A 10a and transformed from relational data into XML. For example, SQL Server 2000 developed by MICROSOFT CORPORATION provides extensive database programming capabilities built on Web standards. XML and Internet standard support in that product provides the ability to store and retrieve data in XML format easily with built-in stored procedures. The data extracted from relational database 14a is converted to an XML document as defined by way of an XML schema 300.

Business A 10a uses transform T1 to extract and convert the data stored in its own proprietary database 21a to an intermediary XML format described by XML schema 300. Thereafter, Business B 10b can use the XML schema to map the data from the XML into the proper tables (e.g., 33, 35, 37, and 39). For example, XPATH queries can be used to pull data from the XML documents that are extracted from the database 14a or Business 10b can transform the data stored in the XML document transform T2 to extract data using XML schema 300 into its proprietary database 21b.

XML Schema

XML Schema is itself an XML vocabulary for describing XML instance documents. The term "instance" is used because a schema describes a class of documents, of which there can be many different instances (see FIG. 3A). This is analogous to the relationship between classes and objects in today's object-oriented systems. A class is to an object what a schema is to an XML document. Therefore, while using XML Schema, a system is typically working with more than one document, as well as the schema and one or more XML instance documents.

The elements used in a schema definition come from the http://www.w3.org/2001/XMLSchema namespace. The following is the basic schema template:

```
<xsd:schema xmlns:xsd="http://www.w3.org/2001/XMLSchema"
    targetNamespace="http://example.org/employee/">
    <!-- definitions go here -->
</xsd:schema>
```

Schema definitions must have a root xsd:schema element. There are a variety of elements that may be nested within xsd:schema including, but not limited to, xsd:element, xsd:attribute, and xsd:complexType, all of which are well known in the art.

A schema definition can be processed with standard XML tools and services such as DOM, SAX, XPath, and XSLT.

The definitions placed within the xsd:schema element are automatically associated with the namespace specified in the targetNamespace attribute. In the case of the previous example, the schema definitions would be associated with the http://example.org/employee/namespace.

Figure 3A:
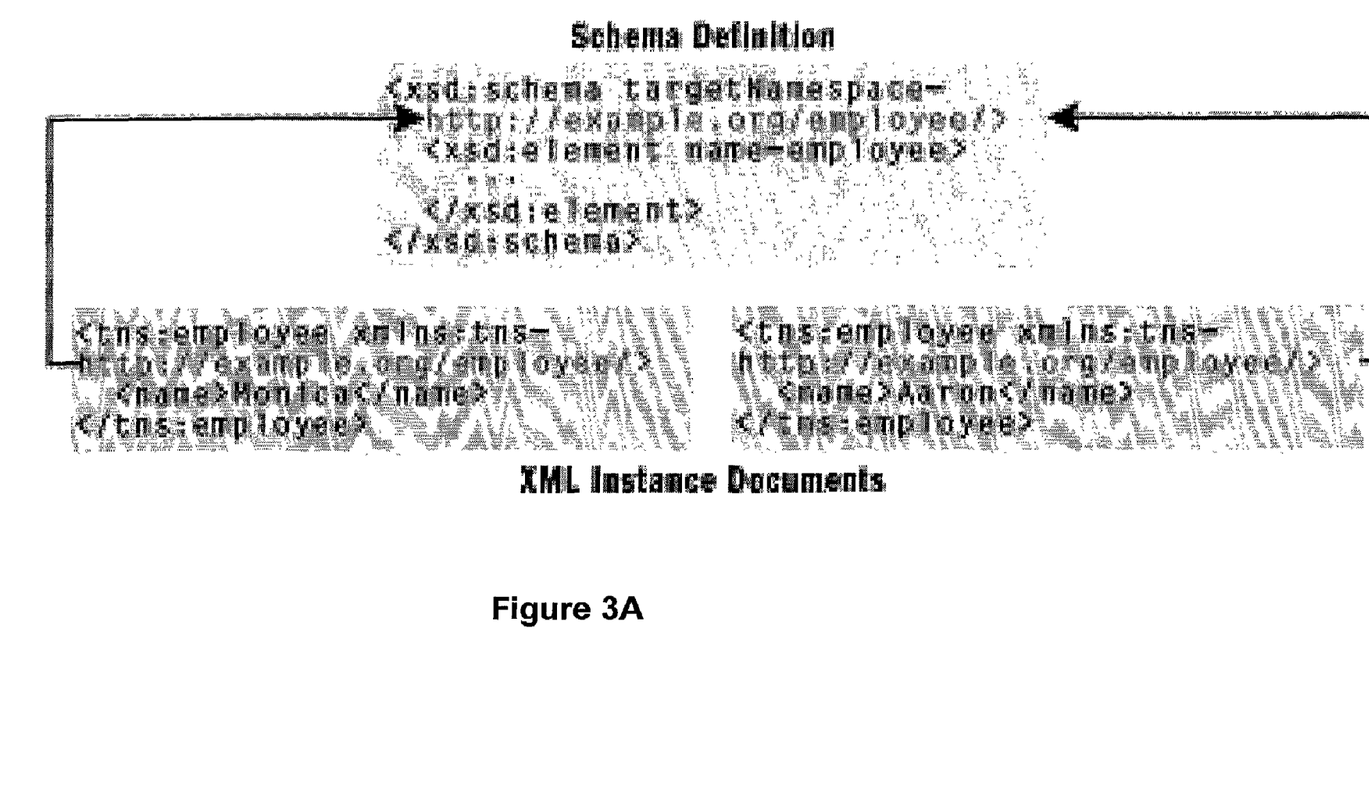
FIG. 3A is an illustration of the linking between an XML document and an XML schema.

The namespace identifier is the key that links XML documents to the corresponding Schema definition (see FIG. 3A).

In order to take advantage of the schema while processing an element, the processor needs to locate the correct schema definition. How schema processors locate the schema definition for a particular namespace is not defined by a standard specification. Most processors, however, allow an in-memory cache loading of schemas that it will use while processing documents. For example, the following JScript®-based code illustrates a simple way to do this with MSXML 4.0:

```
var sc = new ActiveXObject("MSXML2.XMLSchemaCache.4.0");
sc.add("http://example.org/employee/", "employee.xsd");
var dom = new ActiveXObject("MSXML2.DOMDocument.4.0");
dom.schemas = sc;
if (dom.load("employee.xml"))
    WScript.echo("success: document conforms to Schema");
else
    WScript.echo("error: invalid instance");
```

It works similarly in Microsoft® .NET and in most other XML Schema-aware processors.

XML Schema also provides the schemaLocation attribute to provide a hint in the instance document as to the whereabouts of the required schema definitions. The schemaLocation attribute is in the http://www.w3.org/2001/XMLSchema-instance namespace, which was set aside specifically for attributes that are only used in instance documents. The xsi:schemaLocation attribute takes a space-delimited list of namespace identifier and URL pairs, as shown here:

```
<tns:employee xmlns:tns="http://example.org/employee/"
    xmlns:xsi="http://www.w3.org/2001/XMLSchema-instance"
    xsi:schemaLocation="http://example.org/employee/
                http://develop.com/aarons/employee.xsd"
/>
```

In this case, if the processor doesn't already have access to the appropriate schema definition for the http://example.org/employee/namespace, it can download it from http://develop.com/aarons/employee.xsd.

Annotated Schema

The transformation of transform T1 to create XML views of the relational data of database 21a can be created using, for example, XDR (XML-Data Reduced) schemas or XSD (XML Schema Definition) as described above.

When moving data from relational tables to XML documents, additional information may be required to ensure a smooth mapping. Annotated Schemas serve this purpose. An annotated schema allows a user to specify special mappings between the XML document and the relational data. For example, if the format of the returned XML can remain unchanged, an annotated schema may be used to define which columns will be expressed as elements, and which columns will be expressed as attributes. Annotated schemas facilitate further modification to the result set using standard XPath. An annotated schema is an XML schema document that specifies both the tables and columns that are to be queried, and the structure of the resulting XML.

Consider the following schema:

```
<?xml version="1.0" encoding="utf-8" ?>
<xs:schema xmlns:xs="http://www.w3.org/2001/XMLSchema"
    xmlns:sql="urn:schemas-microsoft-com:mapping-schema">
    <xs:element name="Order" sql:relation="Orders">
        <xs:complexType>
            <xs:sequence>
                <xs:element name="OrderDate" type="xs:dateTime" />
                <xs:element name="ShipName" type="xs:string" />
            </xs:sequence>
            <xs:attribute name="OrderID" type="xs:int" />
            <xs:attribute name="CustomerID" type="xs:string" />
            <xs:attribute name="EmployeeID" type="xs:int" />
        </xs:complexType>
    </xs:element>
</xs:schema>
```

This schema uses the standard W3 schema syntax with a single exception. The "sql" namespace contains extensions that map the components of the schema to specific tables and columns in a relational database. In this case, the XML element names are identical to the database column names, so the only specific relationship that needs to be established is that of the Order element to the Orders table. This schema can be invoked with the following code:

```
SqlXmlCommand cmd = new SqlXmlCommand(NorthwindConnString);
cmd.RootTag = "Orders";
cmd.CommandText = "Order";
cmd.CommandType = SqlXmlCommandType.XPath;
cmd.SchemaPath = @"..\..\Orders1.xsd";
FileStream f = new
FileStream(@"c:\products.xml",FileMode.Create);
cmd.ExecuteToStream(f);
f.Close( );
System.Diagnostics.Process.Start(@"c:\products.xml");
```

In this example, the SchemaPath property specifies a physical path to a schema file. This path is relative to the location of the executable. The schema file is used to map the resulting XML to tables and columns in the database. The CommandText property specifies an XPath query that defines the XML result set. In other words, the schema may specify that all orders be returned, but CommandText may limit the result to orders that match a specific criterion. In the current example, the following XML is returned:

```xml
<?xml version="1.0" encoding="utf-8" ?>
<Orders>
    <Order EmployeeID="5" CustomerID="VINET" OrderID="10248">
        <OrderDate>1996-07-04T00:00:00</OrderDate>
        <ShipName>Vins et alcools Chevalier</ShipName>
    </Order>
    <Order EmployeeID="6" CustomerID="TOMSP" OrderID="10249">
        <OrderDate>1996-07-05T00:00:00</OrderDate>
        <ShipName>Toms Spezialitäten</ShipName>
    </Order>
    ...
</Orders>
```

The annotated schema enables the return of some columns from the relational table as elements and other columns as attributes.

These views can then be queried using XPath queries. This is similar to creating views using CREATE VIEW statements and specifying SQL queries against the view. An XML schema describes the structure of an XML document and also various constraints on the data in the document. When XPath queries are specified against the schema, the structure of the XML document returned is determined by the schema against which the XPath query is executed.

Figure 4:
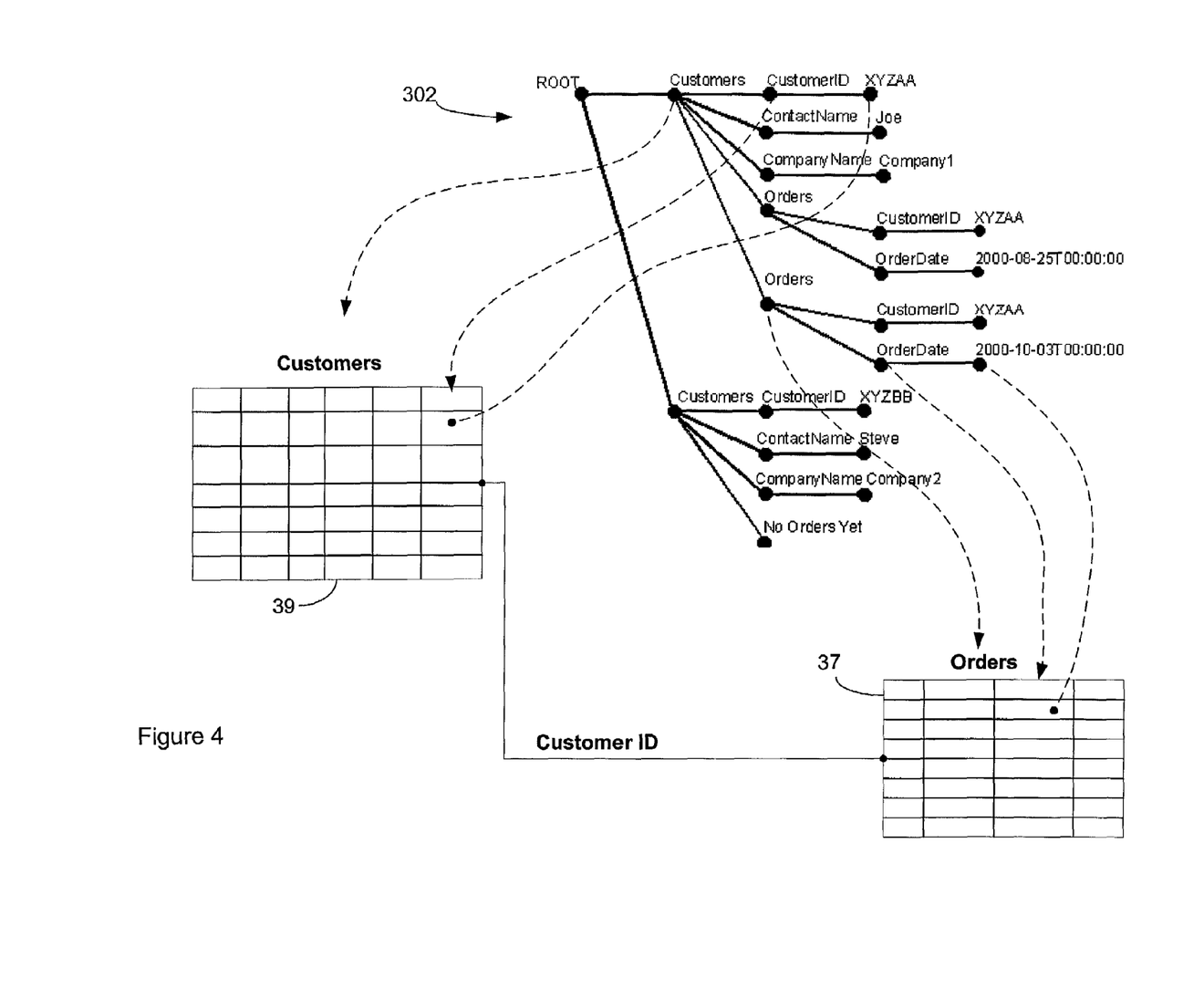
FIG. 4 is an illustration of the mapping of hierarchical data to a relational table.

FIG. 4 illustrates the hierarchical mapping of an XML schema to relational tables. In this example, tables 39 and 37 represent "Customers" and "Orders" tables respectively that are stored in database 21b (see also FIG. 3). As shown, the nodes labeled "Customers" implicate Customers table 39 and nodes labeled "Orders" implicate Orders table 37. The child nodes of customer could be either columns within the Customers table 39 or may represent data stored in a table related to Customers table 39. For example, nodes labeled CustomerID implicate a column in the Customers table 39, whereas nodes labeled Orders implicate Orders table 37. Child nodes of table column names represent row information to be stored in the column. For example, node labeled "XYZAA" represents data for the CustomerID column of Customers table 39.

Nodes at the same level in the hierarchy such as CustomerID, ContactName, CompanyName all represent columns within the same table, e.g., table 39, or represent a table having a relation to the table. An example of a relation is Orders table 37, which is related to Customers table 39 by way of the CustomerID key. Notice, for example, that the CustomerID node child of the Orders node has the same identifier as the CustomerID child of Customers. This indicates that the nodes are mapped to two different tables with a key relation CustomerID.

Such a hierarchical structure might be represented by the following XML schema fragment:

```
<xsd: element name = "Customer"
    sql:relation = "Customer">
    <xsd:complex type>
        <xsd:sequence>
            <xsd:element name = "CutomerID"
                sql:field = "CustomerID"/>
        </xsd:sequence>
        <xsd:Attribute name = "ContactName"
            sql:field = "ContactName"/>
        <xsd:complex type>
        ...
```

A corresponding XML document would then contain the following:

```
<Customer ContactName = "Joe">
    <CustomerID> "XYZAA"</CustomerID>
</Customers>
```

In general, all element and attribute data which is contained in the body of an XML document is mapped to corresponding tables and columns in the underlying SQL database.

Excluding Elements in the Schema

Since by default each element and attribute in the XML schema is mapped to a corresponding relation or field in the SQL database, it would be desirable to specify that an element specified in the XML schema is not applicable to the XML-to-relational mapping. Accordingly an annotation is defined that facilitates hiding some of the relational fields that are returned from a query such as an XPATH query.

The invention contemplates defining an annotation such as sql:hide wherein when sql:hide is set to "true," a given element or attribute can be used as any part of the XPath query, but will not be returned as part of the instance document. Preferably, sql:hide will take a Boolean value such as "sql:hide="true" to set a value to hide. Sql:hide could be applied in a variety of embodiment; however, for example, once specified on an element, the entire element will be hidden.

The example below provides an XML Schema fragment wherein sql:hide is set for the element "shipTo." As a result, shipTo values are not returned as part of the instance document.

```
<element name="PurchaseOrder">
<complexType >
    <sequence>
        <element name="shipTo" type="string" sql:hide="true" />
        <element name="billTo" type="string"/>
        <element name="items"   type= "Items"/>
    </sequence>
    <attribute name="orderDate" type="date"/>
</complexType>
</element>
```

Figure 5:
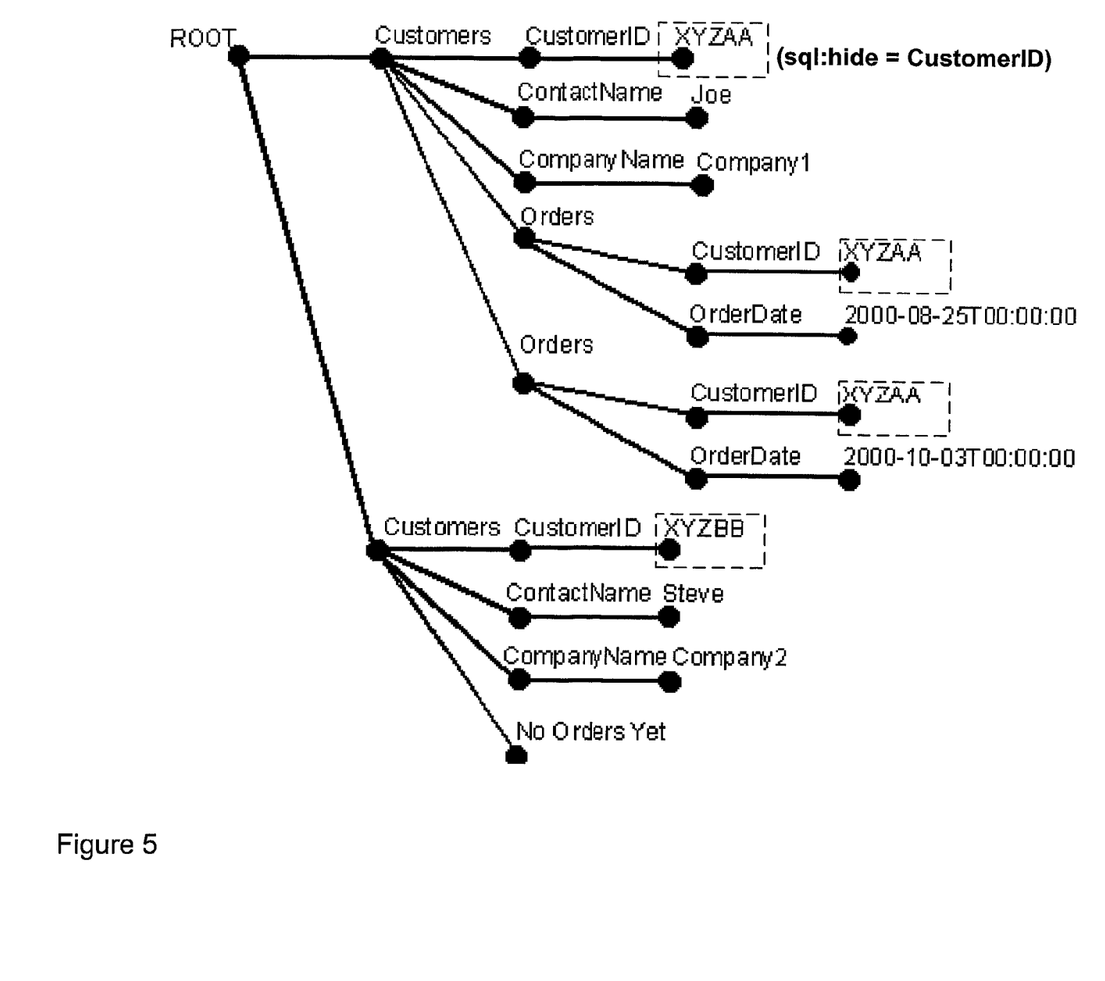
FIG. 5 is an illustration of the mapping of hierarchical data from a relational table where certain elements in the hierarchical structure have been omitted.

The sql:hide notation is further illustrated in FIG. 5. By specifying sql:hide on a particular element or attribute, that attribute will not be returned in an XPath query. However, the element or attribute could still be used as part of the query. For example, a query that specified Customers whose CustomerID is greater a given number would return the data for all such customers but would not return the actual CustomerID (as indicated by dashed lines in the figure).

Recursion

Referring an ancestor node or using same type of an ancestor node in XML is known as a "circular-reference". This type of relationship is useful for recursive hierarchical references such as Employee→Manager. However, determining the recursion depth would normally require inspecting the data in a separate pass. A max-depth annotation on circular references allows queries to be constructed independently of the data and the hierarchy to be constructed more efficiently.

The following XML schema fragment illustrates the use of the max-depth annotation (indicated in bold) in accordance with the present invention:

```
<xsd:schema xmlns:xsd="http://www.w3.org/2001/XMLSchema"
        xmlns:dt="urn:schemas-microsoft-com:datatypes"
        xmlns:sql="urn:schemas-microsoft-com:mapping-schema">
    <xsd:annotation>
        <xsd:documentation>
            Customer-Order-Order Details Schema
            Copyright 2000 Microsoft. All rights reserved.
        </xsd:documentation>
        <xsd:appinfo>
            <sql:relationship name="SupervisorSupervisee"
                parent="Employee"
                parent-key="ReportsTo"
                child="Employee"
                child-key="EmployeeID" />
        </xsd:appinfo>
    </xsd:annotation>
    <xsd:element name="Employee" type="EmployeeType"
                sql:relation="Employee"
                sql:key-fields="EmployeeID" />
    <xsd:complexType name="EmployeeType">
        <xsd:sequence>
            <xsd:element name="Manager" type="EmployeeType" sql:max-
depth="5"
                sql:relation="Employee"
                sql:key-fields="EmployeeID"
sql:relationship="SupervisorSupervisee"/>
        </xsd:sequence>
        <xsd:attribute name="EmployeeID" type="xsd:int" />
        <xsd:attribute name="FirstName" type="xsd:string"/>
        <xsd:attribute name="LastName" type="xsd:string"/>
        <xsd:attribute name="ReportsTo" type="xsd:int" />
    </xsd:complexType>
</xsd:schema>
```

In the example above, the max-depth has been set to 5. Conceptually, max-depth could be set to any depth that is practicable for a given application. In accordance with an aspect of the invention, the output of XPath queries against data that nests deeper than the setting of max-depth will be silently truncated. That is, the output nesting will only be as deep as max-depth, even if the underlying data has more data. XPath queries that encounter circular paths within a recursion (possibly infinite recursion) will simply output the recursion until max-depth is reached.

In accordance with an aspect of the invention, the max-depth can be specified on the parent or the child (or both) in a nested hierarchy. The max-depth that is defined closest to the root has the precedence (e.g. Parent max-depth overrides child). The rest are ignored. On the other hand, when new elements are declared using reference to other type definitions, any max-depth that is defined on the newly declared element overrides any max-depth defined on the referee type.

Having top-level max-depth annotation allows a user to have different depth values for different contexts.

```
<xsd:schema xmlns:xsd="http://www.w3.org/2001/XMLSchema"
        xmlns:dt="urn:schemas-microsoft-com:datatypes"
        xmlns:sql="urn:schemas-microsoft-com:mapping-schema">
    <xsd:annotation>
        <xsd:documentation>
            Customer-Order-Order Details Schema
            Copyright 2000 Microsoft. All rights reserved.
        </xsd:documentation>
        <xsd:appinfo>
            <sql:relationship name="SupervisorSupervisee"
                parent="Employee"
                parent-key="ReportsTo"
                child="Employee"
                child-key="EmployeeID" />
            <sql:relationship name="HiredByEmployee"
                parent="Employee"
                parent-key="HiredBy"
                child="Employee"
                child-key="EmployeeID" />
        </xsd:appinfo>
    </xsd:annotation>
    <xsd:element name="Employee" type="EmployeeType" sql:max-
depth="2"
                sql:relation="Employee"
                sql:key-fields="EmployeeID" />
    <xsd:complexType name="EmployeeType">
        <xsd:sequence>
            <xsd:element name="Manager" type="EmployeeType"
                sql:relation="Employee"
                sql:key-fields="EmployeeID"
sql:relationship="SupervisorSupervisee"/>
            <xsd:element ref="HireManager" sql:max-depth="1"
sql:relation="Employee"
sql:relationship="HiredByEmployee"/>
        </xsd:sequence>
        <xsd:attribute name="EmployeeID" type="xsd:int" />
        <xsd:attribute name="FirstName" type="xsd:string"/>
        <xsd:attribute name="LastName" type="xsd:string"/>
        <xsd:attribute name="ReportsTo" type="xsd:int" />
        <xsd:attribute name="HiredBy" type="xsd:int" />
    </xsd:complexType>
    <xsd:element name="HireManager" type="HireType" sql:max-
depth="2"
                sql:relation="Employee"
                sql:key-fields="EmployeeID"/>
    <xsd:complexType name="HireType">
        <xsd:sequence>
            <xsd:element name="HireManagerInside" type="HireType"
                sql:relation="Employee"
                sql:key-fields="EmployeeID"
                    sql:relationship="HiredByEmployee"/>
        </xsd:sequence>
        <xsd:attribute name="EmployeeID" type="xsd:int" />
        <xsd:attribute name="FirstName" type="xsd:string"/>
        <xsd:attribute name="LastName" type="xsd:string"/>
        <xsd:attribute name="ReportsTo" type="xsd:int" >
        <xsd:attribute name="HiredBy" type="xsd:int" />
    </xsd:complexType>
</xsd:schema>
```

According to an aspect of the invention, any max-depth annotation that is not defined on a recurring node but in a recurring branch, preferably, is ignored.

```
<xsd:schema xmlns:xsd="http://www.w3.org/2001/XMLSchema"
xmlns:sql="urn:schemas-microsoft-com:mapping-schema">
    <xsd:annotation>
        <xsd:appinfo>
            <sql:relationship name="ee" parent="Employees"
child="Employees" parent-key="EmployeeID" child-key="ReportsTo"/>
        </xsd:appinfo>
    </xsd:annotation>
    <xsd:element name="Employees" sql:relation="Employees">
        <xsd:complexType>
            <xsd:sequence>
```

-continued

```
        <xsd:element ref="Constant" sql:is-constant="1" sql:max-depth="1"/>
      </xsd:sequence>
    </xsd:complexType>
  </xsd:element>
  <xsd:element name="Constant" sql:is-constant="1">
    <xsd:complexType>
      <xsd:sequence>
        <xsd:element ref="Employees" sql:relation="Employees" sql:relationship="ee" sql:max-depth="1"/>
      </xsd:sequence>
    </xsd:complexType>
  </xsd:element>
</xsd:schema>
```

According to an aspect of the invention, schemas that have two or more recurring elements from same type are not error cases. Max-Depth will take care of the situation and allow elements from the same type to recur only the indicated number of times.

```
<xsd:schema xmlns:xsd="http://www.w3.org/2001/XMLSchema"
        xmlns:dt="urn:schemas-microsoft-com:datatypes"
        xmlns:sql="urn:schemas-microsoft-com:mapping-schema">
  <xsd:annotation>
    <xsd:documentation>
      Customer-Order-Order Details Schema
      Copyright 2000 Microsoft. All rights reserved.
    </xsd:documentation>
    <xsd:appinfo>
      <sql:relationship name="SupervisorSupervisee"
          parent="Employee"
          parent-key="ReportsTo"
          child="Employee"
          child-key="EmployeeID" />
      <sql:relationship name="HiredByEmployee"
          parent="Employee"
          parent-key="HiredBy"
          child="Employee"
          child-key="EmployeeID" />
    </xsd:appinfo>
  </xsd:annotation>
  <xsd:element name="Employee" type="EmployeeType"
          sql:relation="Employee"
          sql:key-fields="EmployeeID" />
  <xsd:complexType name="EmployeeType">
    <xsd:sequence>
      <xsd:element name="Manager" type="EmployeeType" sql:max-depth="2"
          sql:relation="Employee"
          sql:key-fields="EmployeeID"
          sql:relationship="SupervisorSupervisee"/>
      <xsd:element name="HireManager" type="EmployeeType" sql:max-depth="2"
          sql:relation="Employee"
          sql:key-fields="EmployeeID"
          sql:relationship="HiredByEmployee"/>
    </xsd:sequence>
    <xsd:attribute name="EmployeeID" type="xsd:int" />
    <xsd:attribute name="FirstName" type="xsd:string"/>
    <xsd:attribute name="LastName" type="xsd:string"/>
    <xsd:attribute name="ReportsTo" type="xsd:int" />
    <xsd:attribute name="HiredBy" type="xsd:int" />
  </xsd:complexType>
</xsd:schema>
```

Figure 6:
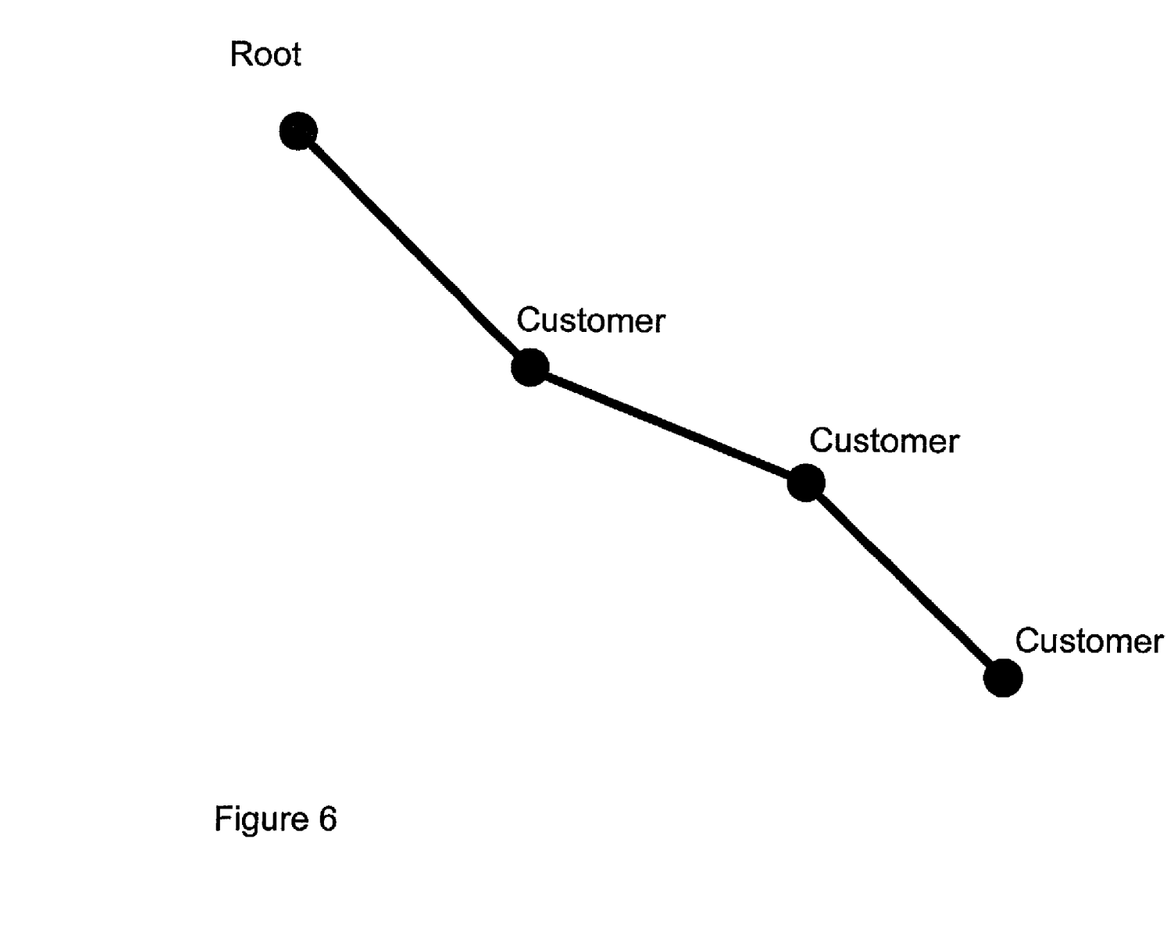
FIG. 6 is an illustration of the mapping of hierarchical data from a relational table where a recursive relationship has been truncated by a pre-specified level.

FIG. 6 further illustrates the max-depth setting for XSD. In this example, a customer may also have customers. Hence, by setting max-depth to three levels deep, the tree will stop creating new customer nodes after the third level of customer.

Sorting XML Data

The document order is significant in XML, and XPath queries do not have a mechanism to sort the query results. On the other hand, the relational model does not guarantee any particular ordering of rows in a database, but has a mechanism to sort the results of a relational query. Thus, when querying relational data with XPath through XML Views a special mechanism is desirable to enforce an order of elements in XML generated from relational rows.

Figure 6A:
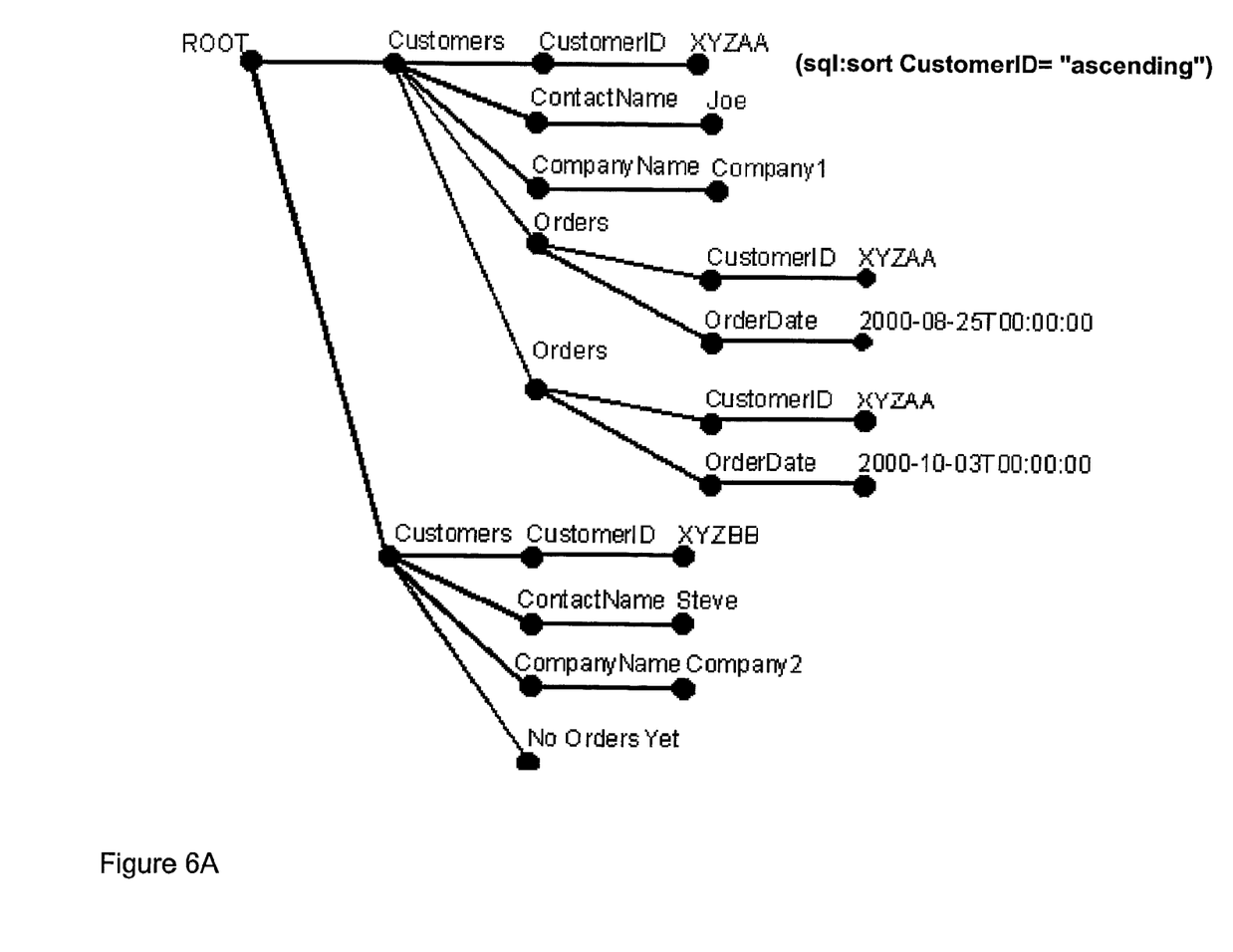
FIG. 6A is an illustration of the mapping of hierarchical data from a relational table where the resulting hierarchical data is sorted.

Accordingly by setting an annotation in the XSD schema, a sort order for mapping the relational data into the XML hierarchy can be established. FIG. 6A illustrates how a sql:sort on the column CustomerID in the table Customers causes the tree to be sorted in the desired manner. That is, CustomerID "XYZAA" comes before CustomerID "XYZBB" and so on for all CustomerIDs in the hierarchy. The sql:sort can be used to generate a sql query of the form select * from Cusomers where [ ] order by CustomerID ascending.

Inserting XML data into a Relational Database

XML annotated schemas promote the mapping of XML documents to relational database rows. This mapping is useful for extracting data from a relational database as well as inserting data into the database. There are instances, however, when it is necessary to generate an identifying number when inserting a row into a database such as an identity number. Such identifying numbers generally have no counterpart in the hierarchical world of XML data. Hence, there is a need for a mechanism to specify the insertion of such a generated number.

Using the sql:identity and sql:guid Annotations, a user can specify the sql:identity and sql:quid annotations in an XSD schema on any node that maps to a database column in a relational database system such as Microsoft® SQL Server (™) 2000. For example, the well known updategram format supports the updg:at-identity and updg:guid attributes. The updg:at-identity attribute defines the behavior in updating an IDENTITY-type column. The updg:guid attribute allows you to obtain a globally unique identifier (GUID) value from SQL Server and use it in the updategram. The sql:identity and sql:quid annotations extend this functionality to DiffGrams.

When you execute a DiffGram, it is first converted to an updategram, and then the updategram is executed. By specifying the sql:identity and sql:quid annotations in the XSD schema, you are in fact defining the behavior of an updategram. Therefore, all the annotations are described in the context of an updategram. The annotations can be used both for DiffGrams and updategrams; however, updategrams already provide a more powerful way of handling identity and GUID values.

sql:guid and sql:identity can be defined on a complex content element.

sql:identity Annotation

You can specify the sql:identity annotation in the XSD schema on any node that maps to an IDENTITY-type database column. The value that is specified for this annotation defines how the IDENTITY-type column is updated (either by using the value provided in the updategram to modify the column or by ignoring the value, in which case a SQL Server-generated value is used for this column).

The sql:identity annotation can be assigned two values: ignore or useValue.

Ignore directs the updategram to ignore any value that is provided in the updategram for that column and to rely on SQL Server to generate the identity value. UseValue directs the updategram to use the value that is provided in the updategram to update the IDENTITY-type column. An updategram does not check whether the column is an identity value or not.

If the updategram specifies a value for the IDENTITY-type column, the sql:identity="useValue" must be specified in the schema.

sql:guid Annotation

An updategram can have SQL Server generate a GUID value and then use this value in the updategram. In the context of DiffGrams, you can use the sql:quid annotation to specify whether to use a GUID value that is generated by SQL Server or use the value that is provided in the updategram for that column.

The sql:quid annotation can be assigned two values: generate or useValue.

Generate specifies that the GUID that is generated by SQL Server be used for that column in the update operation. UseValue specifies that the value that is specified in the updategram be used for the column. This is the default value.

Figure 7:
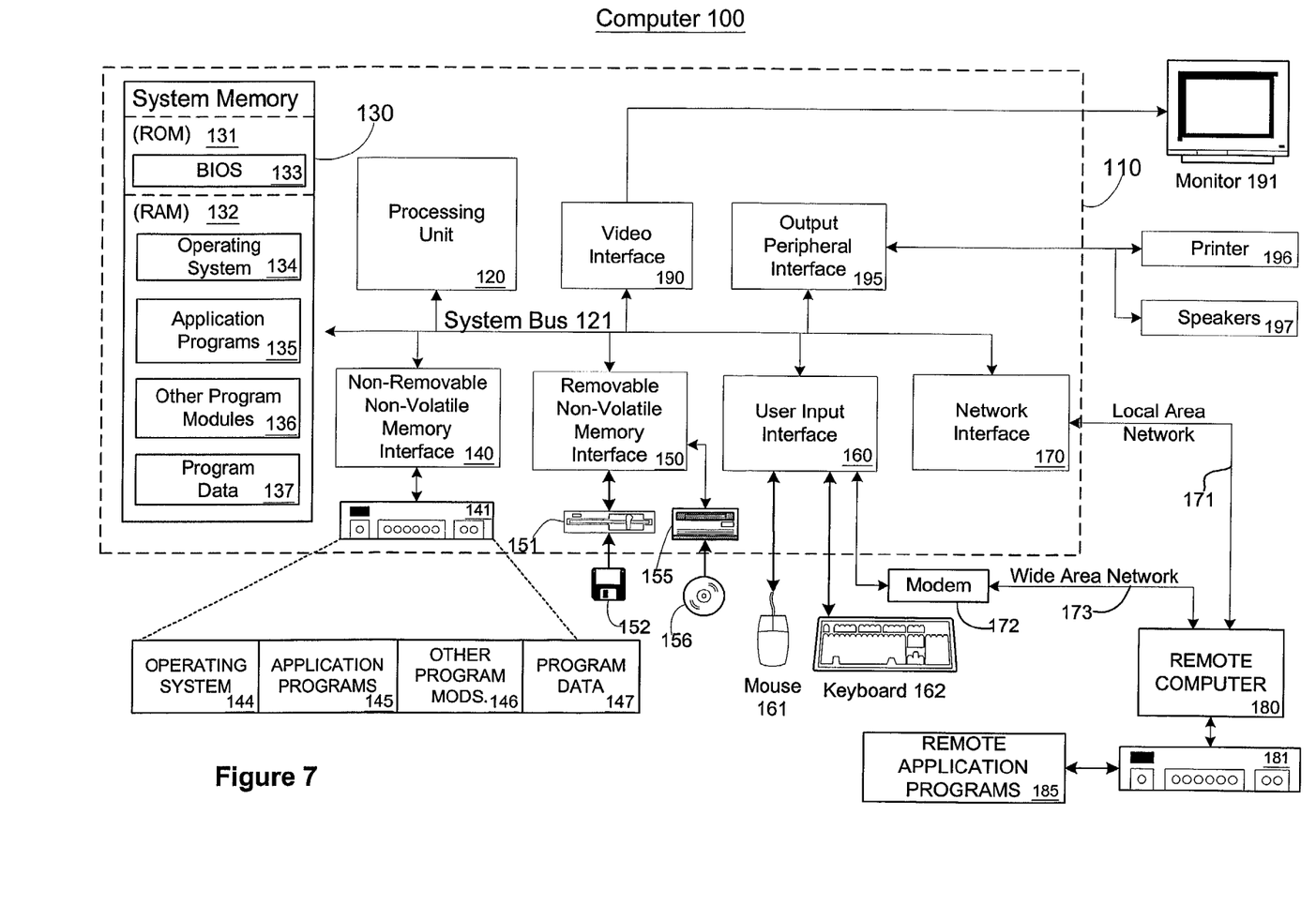
FIG. 7 is a block diagram of an exemplary computing environment in which aspects of the invention may be implemented.

With reference to FIG. 7, an exemplary system for implementing the invention includes a general purpose computing device in the form of a computer 110 that could form a portion of client computer 20a-20c or server computers 21a, 21b (see FIG. 1). Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

Computer 110 may also include other removable/non-removable, volatile/nonvolatile computer storage media. By way of example only, FIG. 7 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7, provide storage of computer readable instructions, data structures, program modules and other data for the computer 110. In FIG. 7, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices may include a microphone 163, joystick, game pad, satellite dish, scanner, or the like (not shown). These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 7. The logical connections depicted in FIG. 7 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 7 illustrates remote application programs 185 as residing on memory device 181. It will be appreciated that the network connections shown are exemplary and other means of establishing a communications link between the computers may be used.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. Therefore, the present invention should not be limited to any single embodiment, but rather construed in breadth and scope in accordance with the appended claims.

What is claimed is:

1. A computer-implemented method for mapping hierarchical data from a relational table comprising:
   providing a schema for a hierarchical data structure wherein the schema defines a hierarchical relationship of data elements;
   identifying from the schema a node within the hierarchical data structure corresponding to a column in the relational table;
   determining that an element of the data elements in the schema is associated with an indicator that specifies the element as a hidden element;
   copying data from the relational table to the hierarchical data structure, wherein the copied data excludes the hidden element; and
   storing the hierarchical data structure that includes the copied data in a computer-readable storage medium.

2. The method as recited in claim 1 wherein the hierarchical data structure comprises an extensible markup language (XML) document.

3. The method as recited in claim 1 wherein the relational table comprises a table in a structured query language (SQL) database.

4. The method as recited in claim 1 wherein the schema comprises an XML schema definition (XSD).

5. The method as recited in claim 1 wherein the copying act is performed in response to an XPath query.

6. A system for mapping hierarchical data from a relational table comprising:
   a schema for a hierarchical data structure wherein the schema defines a hierarchical relationship of data elements;
   processing means for identifying from the schema a node within the hierarchical data structure corresponding to a column in the relational table;
   processing means for determining that an element of the data elements in the schema is associated with an indicator that specifies the element as a hidden element;
   processing means for copying data from the relational table to the hierarchical data structure, wherein the copied data excludes the hidden element; and
   processing means for storing the hierarchical data structure that includes the copied data in a computer-readable storage medium.

7. The system as recited in claim 6 wherein the hierarchical data structure comprises an extensible markup language (XML) document.

8. The system as recited in claim 6 wherein the relational table comprises a table in a structured query language (SQL) database.

9. The system as recited in claim 6 wherein the schema comprises an XML schema definition (XSD).

10. The system as recited in claim 6 wherein the copying act is performed in response to an XPath query.

11. A computer-implemented method for mapping hierarchical data from a relational table comprising:
   providing a schema for a hierarchical data structure wherein the schema defines a hierarchical relationship of data elements;
   identifying from the schema a node within the hierarchical data structure corresponding to a column in the relational table; and
   copying a predefined number of data values from the relational table to the hierarchical data structure wherein the predefined number of data values are from the same column of the relational table and each data value has a child relationship with another one of the data values and wherein the predefined number is determined from the schema.

12. The method as recited in claim 11 wherein the hierarchical data structure comprises an extensible markup language (XML) document.

13. The method as recited in claim 11 wherein the relational table comprises a table in a structured query language (SQL) database.

14. The method as recited in claim 11 wherein the schema comprises an XML schema definition (XSD).

15. The method as recited in claim 11 wherein the copying act is performed in response to an XPath query.

16. A system for mapping hierarchical data from a relational table comprising:
   a schema stored in a memory for a hierarchical data structure wherein the schema defines a hierarchical relationship of data elements;
   processing means coupled to said memory for identifying from the schema a node within the hierarchical data structure corresponding to a column in the relational table; and
   processing means for copying a predefined number of data values from the relational table to the hierarchical data structure wherein the predefined number of data values are from the same column of the relational table and each data value has a child relationship with another one of the data value and wherein the predefined number is determined from the schema.

17. The system as recited in claim 16 wherein the hierarchical data structure comprises an extensible markup language (XML) document.

18. The system as recited in claim 16 wherein the relational table comprises a table in a structured query language (SQL) database.

19. The system as recited in claim 16 wherein the schema comprises an XML schema definition (XSD).

20. The system as recited in claim 16 wherein the copying act is performed in response to an XPath query.

21. A computer-implemented method for inserting hierarchical data into a relational table, comprising:
   providing a schema for a hierarchical data structure wherein the schema defines a hierarchical relationship of data elements;
   inserting data from the hierarchical data structure into a row of the relational table in a relational database; and
   generating an identification number and inserting the identification number into a field in the row of the relational table when the schema provides an annotation indicative of the insertion of an identification number.

22. The method as recited in claim 21 wherein the hierarchical data structure comprises an extensible markup language (XML) document.

23. The method as recited in claim 21 wherein the relational table comprises a table in a structured query language (SQL) database.

24. The method as recited in claim 21 wherein the schema comprises an XML schema definition (XSD).

25. A system for inserting hierarchical data into a relational table, comprising:
   a schema stored in a memory for a hierarchical data structure wherein the schema defines a hierarchical relationship of data elements;
   processing means coupled to said memory for inserting data from the hierarchical data structure into a row of a relational table in a relational database; and
   processing means for generating an identification number and inserting the identification number into a field in the row of the relational table when the schema provides an annotation indicative of the insertion of an identification number.

26. The system as recited in claim 25 wherein the hierarchical data structure comprises an extensible markup language (XML) document.

27. The system as recited in claim 25 wherein the relational table comprises a table in a structured query language (SQL) database.

28. The system as recited in claim 25 wherein the schema comprises an XML schema definition (XSD).

29. A computer-implemented method for mapping hierarchical data from a first relational table comprising:
   providing a schema for a hierarchical data structure wherein the schema defines a hierarchical relationship of data elements;
   identifying from the schema a first node within the hierarchical data structure corresponding to a first column in the relational table; and
   copying a first data value from the relational table to the hierarchical data structure wherein the first data value is selected from the relational table in a sort order specified by the schema.

30. The method as recited in claim 29 wherein the hierarchical data structure comprises an extensible markup language (XML) document.

31. The method as recited in claim 29 wherein the relational table comprises a table in a structured query language (SQL) database.

32. The method as recited in claim 29 wherein the schema comprises an XML schema definition (XSD).

33. The method as recited in claim 29 wherein the copying act is performed in response to an XPath query.

34. A system for mapping hierarchical data from a relational table comprising:
   a schema stored in a memory for a hierarchical data structure wherein the schema defines a hierarchical relationship of data elements;
   processing means coupled to said memory for identifying from the schema a node within the hierarchical data structure corresponding to a column in the relational table; and
   processing means for copying a data value from the relational table to the hierarchical data structure wherein the first data value is selected from the relational table in a sort order specified by the schema.

35. The system as recited in claim 34 wherein the hierarchical data structure comprises an extensible markup language (XML) document.

36. The system as recited in claim 34 wherein the relational table comprises a table in a structured query language (SQL) database.

37. The system as recited in claim 34 wherein the schema comprises an XML schema definition (XSD).

38. The system as recited in claim 34 wherein the copying act is performed in response to an XPath query.

* * * * *